United States Patent Office 3,789,009
Patented Jan. 29, 1974

3,789,009
PROCESS FOR THE PREPARATION OF LARGE PARTICLE SILICA SOLS
Farhad A. Irani, Part Forest, Ill., assignor to E. I. du Pont de Nemours and Company, Wilmington, Del.
No Drawing. Filed July 15, 1971, Ser. No. 165,786
Int. Cl. B01j 13/00; C01b 33/14
U.S. Cl. 252—313 S          8 Claims

ABSTRACT OF THE DISCLOSURE

Large particle size aqueous silica sols having a substantially unimodal particle size distribution are prepared by adding simultaneously an alkali metal silicate and a cation exchange resin to a heel of water containing preformed colloidal silica particles at a pH within the range of 8–11, at a temperature of 60–150° C., and at a rate below that at which nucleation occurs. This process results in products having a concentration of 10–16% $SiO_2$, which can be further concentrated by evaporation to minimum turbidity sols containing 40% or more $SiO_2$.

BACKGROUND OF THE INVENTION

This invention relates to a process for the production of concentrated aqueous silica sols of minimum turbidity, and particularly, silica sols containing large, spherical, non-aggregated particles.

The art is familiar with aqueous silica sols and methods for producing them. For example, the processes described in U.S. Pats. 2,631,134 (to Iler et al.) and 2,974,109 (to Dirnberger) permit the direct preparation of sols having higher silica concentrations than the sols prepared by earlier processes. Large particle sols could be made by the build-up technique described in U.S. Pats. 3,462,374 (to Klosak), 3,440,176 (to Sipple), and 3,440,174 (to Albrecht). All these processes involve the addition of preformed dilute acid sol to a heel of silica particles, followed by growth of the particles in the heel. Even though it is possible to obtain by such methods silica sols of relatively low turbidity, those methods require long reaction times and high amounts of heat.

There is a need, therefore, for an economical and simple process for the production of stable, concentrated silica sols having minimum turbidity commensurate with their particle sizes.

SUMMARY OF THE INVENTION

According to this invention, it has now been discovered that silica sols having large particles and minimum turbidity are readily made by simultaneously adding at a temperature of 60–150° C. an alkali metal silicate and a cation exchange resin in hydrogen form with good agitation to a heel of water containing preformed, alkali-stabilized, colloidal silica particles having a number average diameter of at least 4 m$\mu$ so as to maintain a pH of 8–11. The feed rate must be maintained below the rate at which nucleation occurs. "Large particle" silica sols have particles having a number average diameter greater than about 15 m$\mu$.

DETAILED DESCRIPTION OF THE INVENTION

In the process of the present invention, most of the alkali metal ions are removed by the ion exchange resin, and subcolloidal silicic acid is formed which instantaneously accretes on the preformed silica particles in the heel. In using this build-up procedure it is important to avoid the formation of new nuclei during the addition of the alkali metal silicate. The feed rate then should not exceed a certain maximum value per unit time per adsorbing surface area in the heel.

While, theoretically, the permissible feed rate should increase with time because of the increase in the total adsorbing surface area, it is more practical in plant operations to operate at a constant feed rate. If the feed rate exceeds the permissible rate initially, but is kept constant, a stage will be reached at which the feed rate will no longer cause supersaturation in the mixture and, consequently, no new nuclei will be formed. Nucleation cannot be observed visually during a run, but the degree of nucleation can be estimated by sampling the reaction mix at intervals, rapidly cooling the samples to room temperature to stop the reaction, and studying the particle size distribution from electron micrographs of the sample. When no nucleation occurs, only one peak is seen. When nucleation occurs, a second peak in the small particle size area is observed.

In the preferred embodiment of this invention, the feed rate is constant and always below the permissible rate. Under these conditions, the rate of silica accretion is less than proportional to the instantaneous adsorbing surface area in the heel. The resulting final sol will have a unimodal particle size distribution (i.e. single peak distribution) but with a smaller average particle size than possible under the proportional feed rate conditions.

The reaction conditions should be controlled within rather narrow, critical limits. The preferred reaction temperature is 90–100° C., and the preferred pH range is 8.5–9.5. The alkali metal silicate solution and the cation exchanger in hydrogen form are added slowly to the well-agitated water heel containing the preformed silica nuclei. The rate of addition is about 0.02–0.23, preferably about 0.110–0.225, grams of $SiO_2$ per hour per gram of heel water. The dilute sol directly formed in this process has a concentration of 10–16% $SiO_2$. It is separated from the ion exchange resin and can be further concentrated by evaporation to a concentration of 40% $SiO_2$ by weight, or more.

The initial silica heel particles must be substantially spherical, discrete (nonagglomerated) entities. Their preferred diameter is about 12–5 m$\mu$. The initial amount of silica in the heel is about 3–20% by weight of the total silica in the batch at the end of the run. Knowing the size of the batch and the final silica concentration, it is easy to calculate the amount of silica in the batch. The preferred amount is 10–20% by weight of the total batch silica. The ratio of silica to the alkali metal (expressed as alkali metal oxide) should be from 50:1 to 250:1, but preferably between 90:1 and 230:1. The titratable alkali, expressed as the alkali metal oxide, should be 0.20–0.45 weight percent of the total silica particles in the initial heel.

The colloidal silica particles in the initial heel can be prepared in any convenient manner. Suitable aqueous silica sols can be prepared by the method of U.S. 2,574,902 (to Bechtold and Snyder) or by the methods of the aforementioned U.S. Pats. 2,631,134 and 2,974,109, all of them involving deionization of alkali metal silicates with ion exchange resins.

The alkali metal silicate used as the starting material in the process of the present invention can be any water-soluble silicate such as, for example, sodium silicate, lithium silicate, and potassium silicate in any mole ratio of silica to the alkali metal, expressed as alkali metal oxide. Sodium silicate is the cheapest and, therefore, the most practical starting material. Commercial solutions of alkali metal silicates having a silica:alkali metal oxide ratio of 1:1 to 4:1 are suitable.

The cation exchange resins suitable in the process of this invention can be either organic or inorganic polymeric materials capable of exchanging cations. Several such resins are well known and are available commercially. The organic ion exchange resins include carboxylic resins, sulfonated natural materials, such as coal, lignin, and peat; sulfonated phenolformaldehyde resins; and sulfonated styrene-divinylbenzene copolymers. The inorganic cation exchangers can be either naturally occurring zeolites or synthetic zeolites. The resins are sold under a variety of trade names, such as Amberlite® (Rohm & Haas Co.), Dowex® 50 (Dow Chemical Co.), Ionac®, Permutit®, and Zeokarb® (the last three, Sybron Corp.). Preferred ion exchange resins are the phenolic methylenesulfonic acid and the nuclear sulfonic acid types and resins containing carboxylic acid functionality within a crosslinked acrylic matrix.

The exchanger is initially in the hydrogen form. After it has been exhausted, it is regenerated and rinsed. It is practical at this stage to remove all the residual silica nuclei held in the fine pores of the exchanger, because the homogeneity and clarity of the final sol are improved by this treatment.

This step is best carried out with the resin in the expanded, sodium form prior to the regeneration, since the swollen resin pores allow for improved silica extraction. Suitable silica extraction agents include aqueous hydrogen fluoride, alkali metal bifluorides, and alkali metal hydroxide solutions.

The addition of alkali metal silicate and iron exchange resin to the water heel containing preformed nuclei must be carried out with vigorous agitation to ensure proper temperature and pH control. Under these conditions the incipiently formed silicic acid polymerizes instantaneously on the heel nuclei. The effectiveness of agitation can be judged by determining pH simultaneously in different locations of the reaction medium. If the pH does not fluctuate among the several measurement points, either in the horizontal plane or the vertical plane, the agitation is ordinarily considered adequate.

The reaction temperature should likewise be held uniform and constant, i.e., it should not fluctuate by more than about 2-3° C. Automatic thermostatic control devices are, therefore, required. While any convenient heat source is suitable, including electrical heaters, steam heaters, steam injectors, or direct flame heaters, it is preferred to use steam injectors, steam coils, or steam jackets.

In the preferred embodiment of the invention the initial water heel contains 1-3 weight percent silica and is maintained at a temperture between 90° C. and 100° C. In the case of a heel containing nuclei of 12-13 m$\mu$ diameter, the preferred rate of addition of the alkali metal silicate is between $0.220 \times 10^{-3}$ and $0.225 \times 10^{-3}$ grams of silicate as silica, per gram of water in the initial heel per hour. The rate of addition is dependent on the size and number of the initial nuclei in the heel.

To determine the specific surface area, S, the product is titrated as described by G. W. Sears in Analytical Chemistry 28, 1981 (1956). The number average particle diameter, D, can then be obtained from the relationship $D=K/S$, where D is expressed in millimicrons, and S is expressed in m.$^2$/g. SiO$_2$. K is a constant dependent on the density of silica and varies from about 2700 to about 3000. For convenience, the value of K=3000 is used throughout this disclosure in all calculations. This relationship is discussed in R. K. Iler, The Colloid Chemistry of Silicon and Silicates, Cornell University Press, 1955.

The stability of a sol is related to the ratio of total surface area per volume of sol, which ratio is expressed in m.$^2$/l. This ratio is conveniently calculated by multiplying the specific surface areas by the density in g./l. As the particle population density increases, there is a greater probability of interparticle contact leading ultimately to gelation. There is, therefore, a critical sol concentration for any given average particle size. For example, a sol with a number average surface area of about 400 m.$^2$/g. has a concentration limit of about 30% SiO$_2$. A larger particle sol with a surface area of about 220 m.$^2$/g. cannot be concentrated beyond 40-41% SiO$_2$. To get stable concentrated sols containing more than 45% SiO$_2$, it is necessary first to grow the constituent silica particles to the required large size. The process of the present invention provides an easy and economical way of growing colloidal SiO$_2$ particles prior to the concentration of the sol. In addition, the product is a unimodal sol having the minimum turbidity commensurate with the particle size.

The sol turbidity $\tau$ is defined as In $(I_0/I)/L$, where the incident light intensity is $I_0$; the transmitted light intensity is I; and the length of the light path through the sample is L. The turbidity can be determined by measuring the light transmitted by the sol on the log scale of a Fisher Electrophotometer AC model, using a B-525 green filter and a 23 ml. cylindrical cell. The reference cell contains distilled water. The scale reading is multiplied by a calibration factor to give turbidity.

This invention is now illustrated by the following examples in which all proportions and percentages are by weight unless indicated otherwise. Commercial silica sols of the type used in the examples have a typical SiO$_2$:Na$_2$O ratio of 90-95.

Example 1

The silica sol used as the sources of preformed nuclei contained 40.48% SiO$_2$ and had a specific gravity of 1.307 and a specific surface area of 222 m.$^2$/g. Sixty-five ml. of this sol, constituting about 11 weight percent of the total silica expected at the end of the run was added to 1692 ml. of water contained in an agitated reactor equipped with high temperature pH electrodes. The resulting heel was heated to 95° C. by direct steam injection and had a pH of 9.0.

A carboxylic acid cation exchange resin in the sodium form was regenerated to the hydrogen form and vacuum filtered. It was then added at a substantially constant rate simultaneously with a sodium silicate solution

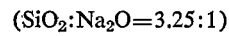

$$(SiO_2:Na_2O=3.25:1)$$

containing about 28.4% SiO$_2$. The rate of addition was controlled to maintain the reactor pH at 9.0±0.3. At the same time, the reactor temperature was maintained at 95±0.5° C. by direct steam injection. The agitation provided was excellent, as was evident from a pH profile analysis which showed that the maximum pH variation as electrodes were moved either vertically or horizontally at any height in the reaction medium was 0.05 pH units.

The addition of sodium silicate and of the resin was continued for 45 minutes. During that time 720 ml. of the silicate solution was added, giving a feed rate of 0.224 g. of SiO$_2$ per gram of heel water per hour. At the end of the addition, the hot sol was siphoned out, vacuum filtered, and cooled. The sol so formed had a concentration of 11.12% SiO$_2$, specific surface area of 157 m.$^2$/g. (corresponding to average particle size of 19.1 m$\mu$), and turbidity of 46.2 cm.$^{-1}$. It was concentrated by direct evaporation of water to yield a sol containing 48.35% SiO$_2$, and having a specific surface area of 95 m.$^2$/g. (corresponding to 31.6 m$\mu$), with a turbidity of 36.3 cm.$^{-1}$.

Example 2

The experimental conditions were the same as in Example 1, except that 80 ml. of the preformed silica sol was used as the source of the heel nuclei. The dilute sol contained 11.85% SiO$_2$. It had a specific surface area of 159 m.$^2$/g. (corresponding to a particle diameter of 18.8 m$\mu$), and a turbidity of 35.3 cm.$^{-1}$. This sol was concentrated by evaporation to a concentration of 54.6% SiO$_2$. The concentrated sol had a specific surface area of 109 m.$^2$/g. (corresponding to 27.5 m$\mu$), and a turbidity of 30.6 cm.$^{-1}$.

Example 3

This example illustrates an experimental determination of reaction conditions for the case where the feed rates of the cation exchange resin and of the metal silicate are increased with time so as not to exceed the rate of increase of the surface area available in the heel at any time.

The run is made under the same conditions of temperature, pH, heel size, preformed colloidal silica particles as Example 1. The addition of sodium silicate and of the resin is continued for 45 minutes. During that time, the silicate addition rate is increase in a stepwise manner every 5 minutes.

At the end of the run, the dilute sol is studied by electron microscopy to determine the extent of nucleation that may have occurred during the run. If it appears that the selected stepwise rate increase was high enough to have caused nascent supersaturation and, therefore, nucleation during the run, then a second run will be made at a slower rtae. The procedure will be repeated until it is determined at what increasing rate of addition no nucleation occurs. This will establish the appropriate addition conditions.

I claim:
1. A process for preparing a large particle aqueous silica sol having a substantially unimodal particle size distribution, said process comprising the following sequential steps:
   (a) simultaneously adding an alkali metal silicate solution and the hydrogen form of a cation exchange resin at a pH within the range of 8–11 and at a temperature of 60–150° C. with vigorous agitation to a heel of water containing preformed, alkali-stabilized, colloidal silica particles, having a number average diameter of at least 4 millimicrons, the ratio of silica to alkali metal oxide in the heel being from 50:1 to 250:1, at a rate below that at which nucleation occurs; and
   (b) separating the resulting colloidal silica sol from the ion exchange resin;
with the proviso that the initial amount of silica in the heel is about 3–20 weight percent, based on the total silica in the batch at the end of the run.

2. The process of claim 1, wherein the pH range is 8.5–9.5 and the temperature is 90–100° C.

3. The process of claim 1 wherein the number average diameter of the preformed nuclei in the heel is 12–50 millimicrons.

4. The process of claim 1 wherein the initial amount of silica is 10–20 weight percent, based on the total silica in the batch at the end of the run.

5. The process of claim 1 wherein the feed rates of the cation exchange resin and metal silicate increase with time so as not to exceed the rate of increase of the surface area available in the heel at any time.

6. The process of claim 1 wherein the feed rates of the cation exchange resin and metal silicate are constant.

7. The process of claim 1 wherein the alkali metal silicate is sodium silicate.

8. The process of claim 1 wherein the cation exchange resin is a carboxylic acid cation exchange resin.

References Cited

UNITED STATES PATENTS

| | | | |
|---|---|---|---|
| 2,974,109 | 3/1961 | Dirnberger et al. | 252—313 S |
| 2,577,484 | 12/1951 | Rule | 252—313 S |
| 3,113,112 | 12/1963 | McNally et al. | 252—313 S |

RICHARD D. LOVERING, Primary Examiner